United States Patent [19]

Wu

[11] Patent Number: 4,559,386

[45] Date of Patent: Dec. 17, 1985

[54] ABS COMPOSITIONS AND PROCESS FOR PREPARING SAME

[75] Inventor: Wan C. Wu, Longmeadow, Mass.

[73] Assignee: Monsanto Company, St. Louis, Mo.

[21] Appl. No.: 628,367

[22] Filed: Jul. 6, 1984

Related U.S. Application Data

[62] Division of Ser. No. 553,717, Nov. 21, 1983, Pat. No. 4,510,287.

[51] Int. Cl.⁴ .............................................. C08L 55/02
[52] U.S. Cl. ...................................... 525/71; 525/73; 525/75; 525/76; 525/80; 525/84; 525/86
[58] Field of Search ............................................ 525/71

[56] References Cited

U.S. PATENT DOCUMENTS

| | | | |
|---|---|---|---|
| 3,509,237 | 4/1970 | Aubrey | 260/876 |
| 3,576,910 | 4/1971 | Jastrzebski | 260/876 |
| 3,627,855 | 12/1971 | Schott et al. | 260/880 |
| 3,652,721 | 3/1972 | Dalton et al. | 260/876 |
| 3,671,607 | 6/1972 | Lee | 260/876 |
| 3,963,807 | 6/1976 | Howe | 260/876 |
| 4,009,227 | 2/1977 | Ott et al. | 260/876 |
| 4,419,492 | 2/1983 | Simon | 525/71 |
| 4,430,478 | 2/1984 | Schmitt et al. | 525/71 |

FOREIGN PATENT DOCUMENTS 1597749 8/1970 France .

Primary Examiner—Jacob Ziegler
Attorney, Agent, or Firm—Michael J. Murphy; R. Bruce Blance; William J. Farrington

[57] ABSTRACT

An intermediate for use in a polyblend consisting essentially of a copolymer of monoalkenyl aromatic monomer such as styrene and a ethylenically unsaturated nitrile monomer such as acrylonitrile surface grafted onto rubber which is dispersed in a matrix copolymer of the graft copolymer monomers, the dispersed phase being monomodal in particle size distribution and the weight percent of surface-grafted nitrile monomer being less by at least 2% than the weight percent nitrile monomer in the matrix. This intermediate with mismatched nitrile monomer can be blended with another rubber graft copolymer of different particle size dispersed in ungrafted matrix which contains matched nitrile monomer in the surface graft and matrix to provide a polyblend having properties at least equivalent to those obtained by blending two rubber graft copolymers of different particle size dispersed in a matrix which each contain matched nitrile monomer levels in the surface graft and matrix. The mismatched intermediate is prepared by continuous mass polymerization.

19 Claims, No Drawings

ABS COMPOSITIONS AND PROCESS FOR PREPARING SAME

This is a continuation, of application Ser. No. 553,717, filed Nov. 21, 1983, U.S. Pat. No. 4,510,287.

This invention relates to polyblends of rubbers with styrene/acrylontrile-type copolymers which are commonly known as ABS compositions, and more particularly to an ABS polyblend and process for forming same which contains a special ABS intermediate.

As typically disclosed in U.S. Pat. No. 3,509,237, and 3,652,721, ABS polyblends containing two rubber graft copolymers of different average particle sizes dispersed in ungrafted matrix copolymer which may have the same chemical composition as that of the graft phase of the rubber graft copolymers provide the blend with a highly desirable balance of performance properties. Such polyblends are considered to have a bimodal distribution of rubber graft particles, by which is meant that a plot of frequency versus rubber graft particle size exhibits two distinct peaks. U.S. Pat. No. 4,009,227 discloses such an ABS polyblend containing two graft copolymers of different average particle diameters, and further discloses that the weight ratio of polymerized styrene(S) to polymerized acrylonitrile (AN) in the large particle size rubber graft copolymer should be greater than such ratio in the ungrafted matrix copolymer. This '227 patent also typically discloses compositions, such as in Example 2, having a weight level of AN in the graft phase of the rubber graft copolymers which is less than the weight level of AN in the ungrafted matrix copolymer. However, when preparing these compositions by following, for example, the '227 patent, the mismatch between the level of polymerized acrylonitrile in the dispersed rubber graft copolymer(s) versus that in the ungrafted matrix is achieved by blending two or more separately prepared, different polymers, which, it is believed, have essentially matched weights of styrene and acrylonitrile in the graft phase and in the ungrafted matrix. It would be desirable to achieve this advantageous mismatch in a less complicated manufacturing system not requiring manipulation in a blending step of proportions of graft copolymers having individually matched graft phase and matrix levels of polymerized styrene and acrylonitrile, but which differ in particle size from each other.

As disclosed in U.S. Pat. No. 4,417,030, it is desirable to form ABS polymers by continuous mass polymerization, but the products therein disclosed are not described as having a weight mismatch between the graft phase and matrix components.

SUMMARY OF THE INVENTION

Now, however, improvements have been made in preparing ABS compositions having an advantageous balance of performance properties which minimize the aforementioned shortcomings of the prior art.

Accordingly, it is a principal object of this invention to provide an intermediate for use in preparing a polyblend of rubber and polymer consisting at least principally of polymerized monoalkenyl aromatic and unsaturated nitrile monomers, which intermediate, as made, is mismatched in unsaturated nitrile content between surface graft and matrix phases. Such an intermediate is sometimes referred to herein as a "mismatched intermediate".

Another object is to provide such a mismatched intermediate which is an ABS intermediate having a monomodal distribution of rubber graft copolymer particles, by which is meant that a plot of frequency versus graft particle size exhibits one distinct peak.

A further object is to provide an ABS composition containing such a mismatched intermediate as the large particle size component in combination with a separately prepared small particle size rubber graft copolymer.

A specific object is to provide process improvements for preparing an ABS polyblend in which such mismatched intermediate is continuously mass polymerized and then blended with separately prepared ungrafted styrene-acrylonitrile (SAN) matrix and rubber graft copolymer to provide a molding composition having performance properties essentially equivalent to those obtained by a polyblend using components with matched surface graft and matrix AN weight levels.

Other objects of this invention will in part be obvious and will in part appear from the following description and claims.

These and other objects are accomplished by providing an ABS intermediate for use in a polyblend, which consists essentially of a copolymer of styrene and acrylonitrile grafted onto a preformed diene rubber substrate dispersed in ungrafted matrix copolymer of styrene and acrylonitrile, the weight percent of surface-grafted acrylonitrile in the copolymer being different by at least 2%, and preferably less than the weight percent polymerized acrylonitrile in the matrix copolymer.

Also provided is a composition comprising a blend of separately prepared polymeric compositions (A) and (B), (A) being a first rubber graft copolymer formed by graft polymerizing (a) monoalkenyl aromatic monomer and ethylenically unsaturated nitrile monomer on (b) a preformed graftable rubber containing a rubber-forming monomer component to surface graft at least a portion of the polymerizing monomers onto such rubber and provide a first graft copolymer while simultaneously forming a first ungrafted copolymer of such monomers in which such first graft copolymer is dispersed, the level of surface-grafted unsaturated nitrile monomer in the first graft copolymer being different by at least 2 weight percent and preferably less than that in such first ungrafted copolymer and (B) being a second rubber graft copolymer of such monomers on a preformed graftable rubber substrate dispersed in a simultaneously formed second ungrafted copolymer of said monomers, the level of surface-grafted ethylenically unsaturated nitrile monomer in such second rubber graft copolymer being essentially matched with that in such second ungrafted copolymer.

Further provided is a process for preparing a polyblend which comprises the steps of (i) continuously mass polymerizing a mixture of monomers comprising monoalkenyl aromatic monomer and ethylenically unsaturated nitrile monomer in the presence of a preformed graftable rubber containing a rubber-forming monomer component to surface graft at least a portion of the polymerizing monomers onto said rubber and provide a first graft copolymer while simultaneously forming a first ungrafted copolymer of said monomers in which such first graft copolymer is dispersed, the level of surface-grafted ethylenically unsaturated nitrile monomer in the first graft copolymer being different by at least 2 weight percent from that in such first ungrafted copolymer; and (ii) blending the product of step (i) with a composition comprising a second ungrafted copolymer of such monomers and a second graft copolymer of such monomers on a graftable rubber, the level of surface-grafted ethylenically unsaturated nitrile monomer in such second graft copolymer being essentially matched with and differing by less than 2 weight % from that in such second ungrafted copolymer.

The term "copolymer" as used herein means a polymeric system containing two or more monomeric units.

Graft Superstrate and Matrix Copolymer

The monomers grafted on the rubber substrate, sometimes referred to herein as the "graft superstrate", and the ungrafted matrix copolymers of the intermediate and other polyblend components consist at least principally of monoalkenyl aromatic monomer and ethylenically unsaturated nitrile monomer, i.e. such monomers comprise at least 50.0 percent by weight and preferably at least 75.0 percent by weight of the combined weight of graft superstrate and matrix copolymer. Most desirably, such monomers comprise at least 90.0 percent by weight of the graft superstrate and matrix copolymer and the usual commercial compositions are substantially completely comprised of such monomers although minor amounts, i.e., less than 5.0 percent by weight of other components such as chain transfer agents, modifiers, etc., may be included.

Exemplary of monoalkenyl aromatic monomers which may be used in the graft superstrate and matrix copolymers are styrene; alpha-alkyl monoalkenyl monoaromatic compounds, e.g. alpha-methyl-styrene, tert-butyl-styrene, alpha-ethylstyrene, alpha-methylvinyltoluene, alpha-methyl dialkylstyrenes, etc.; ring-substituted alkyl styrenes, e.g. vinyl toluene, o-ethylstyrene, p-ethylstyrene, 2,4-dimethylstyrene, etc.; ring-substituted halostyrenes, e.g. o-chlorostyrene, p-chlorostyrene, o-bromostyrene, 2,4-dichlorostyrene, 2,4 dibromostyrene, etc.; ring-alkyl, ring-halosubstituted styrenes, e.g. 2-chloro-4-methylstyrene, 2,6-dichloro-4-methylstyrene, etc.; vinyl naphthalene; vinyl anthracene, etc. The alkyl substituents generally have 1 to 4 carbon atoms and may include isopropyl and isobutyl groups. If so desired, mixtures of such monoalkenyl aromatic monomers may be employed.

Exemplary of ethylenically unsaturated nitriles which may be used in the graft superstrate and matrix copolymer are acrylonitrile, methacrylonitrile, ethacrylonitrile, and mixtures thereof.

Exemplary of monomers which may be copolymerized with monoalkenyl aromatic monomers and ethylenically unsaturated nitriles are conjugated 1,3 dienes, e.g., butadiene, isoprene, etc.; alpha- or beta-unsaturated monobasic acids and derivatives thereof, e.g. acrylic acid, methyl acrylate, ethyl acrylate, butyl acrylate, 2-ethylhexyl acrylate, methacrylic acid and the corresponding ester thereof, acrylamide, methacrylamide; vinyl halides such as vinyl chloride, vinyl bromide, etc.; vinylidene chloride, vinylidene bromide, etc.; vinyl esters such as vinyl acetate, vinyl propionate, etc.; dialkyl maleates or fumarates such as dimethyl maleate, diethyl maleate, dibutyl maleate, the corresponding fumarates, maleic anhydride, N-phenyl malimide, etc. As is known in the art, the amount of these comonomers which may be included in the graft superstrate or matrix copolymer will vary as the result of various factors.

In addition, the monomer formulation at the time of polymerization may include a preformed polymer or a partially polymerized material such as a partially polymerized monoalkenyl aromatic monomer or copolymer thereof.

The polymerizable monomer mixtures forming graft superstrate and matrix copolymer contain at least 20 percent by weight of the monoalkenyl aromatic monomer and preferably at least 50 percent by weight thereof. They also contain at least 5 percent by weight of the ethylenically unsaturated nitrile and preferably at least 10 percent by weight thereof. From the standpoint of highly advantageous commercial practice, the monomer formulations contain 20 to 95 percent, and preferably 60 to 85 percent, by weight of the monoalkenyl aromatic hydrocarbon and 80 to 5 percent, and preferably 40 to 15 percent, by weight of the ethylenically unsaturated nitrile.

As will be readily appreciated, the copolymer forming the graft superstrate should be compatible with that of the matrix so as to obtain good properties which will require the presence of similar monomers. Prior to this invention, therefore, it was common practice to essentially match the weight levels of the constituents in the rubber graft copolymer superstrates and ungrafted matrix copolymer. For reasons not thoroughly understood, however, the mismatched intermediate of this invention unexpectedly provides improved properties in a blend formed therewith.

With respect to such mismatched intermediate of the invention used to prepare polyblend compositions, as made there must be a functional mismatch therein of at least 2 percent between the weight of ethylenically unsaturated nitrile monomer in the interfacial or surface graft of the graft superstrate versus the weight of polymerized ethylenically unsaturated nitrile monomer in the matrix copolymer. It is preferred that such a mismatch result in a lower level of nitrile monomer in the surface graft of the graft superstrate than in the matrix copolymer, and most preferably, lower by about 5%. The preferred composition of such intermediates comprises about 18 to about 25 weight % of acrylonitrile in the surface graft of the graft superstrate and about 27 to about 33 weight % of polymerized acrylonitrile in the simultaneously formed ungrafted matrix copolymer of such intermediates. The rubber graft copolymer component of such mismatched intermediate composition which is formed during the graft polymerization of the rubber substrate is monomodal in particle size distribution.

With respect to other component(s) of rubber graft copolymer and simultaneously formed ungrafted matrix copolymer used with the mismatched intermediates of the invention to prepare polyblends, the weight of ethylenically unsaturated nitrile monomer in the surface graft of the graft superstrate is desirably essentially matched with, in that it differs by less than 2 weight % from, the weight of polymerized ethylenically unsaturated nitrile monomer in the matrix copolymer in which the rubber graft copolymer is dispersed. Such a composition is sometimes referred to herein as a "matched component".

Compositions containing matched and mismatched ethylenically unsaturated nitrile levels in the surface graft of the graft superstrate versus that in the matrix copolymer are produced by polymerizing the monomers in the presence of the preformed rubber substrate. A portion of the polymer formed grafts onto the preformed rubber although some of the rubber polymer may not be in actual chemical combination with the polymer. Since 100 percent grafting efficiency is not attainable, at least a portion of the monomers polymerized in the presence of the preformed rubber will not chemically combine therewith and will instead provide ungrafted matrix copolymer for the rubber graft copolymer. This ungrafted matrix copolymer may be increased or decreased depending upon the ratio of monomers to rubber, the particular monomer formulation, the nature of the rubber, and the conditions of polymerization. Generally, ungrafted matrix copolymer, separately prepared without the inclusion of rubber, will be compounded with material from the graft polymerization reactions containing both matched and mismatched AN levels to obtain the desired final polyblend composition.

Any of the usual polymerization processes may be used to effect polymerization of ungrafted matrix copolymer, i.e., mass, suspension, emulsion, or combinations thereof, either continuous or batch. Such techniques are well known and preferred systems are described hereafter with respect to formation during both graft and ungrafted copolymerization reactions.

Rubber Substrate

Various rubbers onto which the polymerized monomers may be grafted during polymerization in the presence thereof are utilizable as the substrate of the rubber graft copolymer, including diene rubbers, ethylenepropylene rubbers, acrylate rubbers, polyisoprene rubbers, and mixtures thereof as well as random and block copolymers thereof with each other or other copolymerizable monomers.

The preferred rubbers are diene rubbers or mixtures of diene rubbers, i.e., any rubbery polymer (a polymer having a second order transition temperature not higher than 0° centigrade, as determined by ASTM Test D-746-52T) of one or more conjugated, 1,3 dienes, e.g., butadiene, isoprene, piperylene, chloroprene, pentadiene, etc. Such rubbers include homopolymers and interpolymers of conjugated 1,3-dienes with up to an equal amount by weight of one or more copolymerizable monoethylenically unsaturated monomers, such as monoalkenyl aromatic monomers (e.g., styrene; an aralkylstyrene, such as the o-, m-, and p-methylstyrenes, 2,4-dimethylstyrene, the ar-ethylstyrenes, p-tert-butylstyrene, etc.; an alpha-alkylstyrene, such as alpha-methylstyrene, alpha-ethylstyrene, alpha-methyl-p-methylstyrene, etc.; vinyl naphthalene, etc.; arhalo monoalkenyl aromatic hydrocarbons (e.g., the o-, m-, and p-chlorostyrenes, 2,4-dibromo-styrene, 2-methyl-4-chlorostyrene, etc.); acrylonitrile; methacrylonitrile; alkyl acrylates (e.g., methyl acrylate, butyl acrylate, 2-ethylhexyl acrylate, etc.), the corresponding alkyl methacrylates; acrylamides (e.g., acrylamide, methacrylamide, N-butyl acrylamide, etc.); unsaturated ketones (e.g., vinyl methyl ketone, methyl isopropenyl ketone, etc.); alphaolefins (e.g., ethylene, propylene, etc.); pyridines; vinyl esters (e.g. vinyl acetate, vinyl stearate, etc.); vinyl and vinylidene halides (e.g., the vinyl and vinylidene chlorides and bromides, etc.); and the like.

Although the rubber may contain up to about 2 percent of a crosslinking agent, based on the weight of the rubber-forming monomer or monomers, crosslinking may present problems in dissolving the rubber in the monomers for the graft polymerization reaction, particularly for a mass or suspension polymerization reaction. In addition, excessive rubber crosslinking can result in loss of the rubbery characteristics. The crosslinking agent can be any of the agents conventionally employed for crosslinking diene rubbers, e.g., divinylbenzene, diallyl maleate, diallyl fumarate, diallyl adipate, allyl acrylate, allyl methacrylate, diacrylates and dimethacrylates of polyhydric alcohols, e.g., ethylene glycol dimethacrylate, etc.

A preferred group of rubbers are those consisting essentially of 75 to 100 percent by weight of butadiene and/or isoprene and up to 25 percent by weight of a monomer selected from the group consisting of monoalkenyl aromatic monomers (e.g., styrene) and unsaturated nitriles (e.g., acrylonitrile), or mixtures thereof. Particularly advantageous substrates are butadiene homopolymer or copolymer of 90 to 95 percent by weight butadiene and 5 to 10 percent by weight of acrylonitrile or styrene.

Various techniques are customarily employed for polymerizing rubber monomers including mass, suspension and emulsion polymerization. Emulsion polymerization can be used to produce a latex emulsion which is preferably used as the base for emulsion polymerization of graft copolymer superstrate containing matched polymerized nitrile monomer levels in the superstrate and matrix copolymer to provide the small graft particle size composition for a polyblend to be further described hereafter.

Graft Polymerization Processes

The rubber graft copolymers are prepared by polymerizing monomers of the matrix copolymer in the presence of the preformed rubber substrate. In such graft polymerization reactions, the preformed rubber substrate generally is dissolved in the monomers and this admixture is polymerized so as to combine chemically or graft, either interfacially on the surface of the rubber substrate or within the rubber particles, at least a portion of the monomers on the rubber substrate. Depending upon the ratio of monomers to rubber substrate and polymerization conditions, it is possible to produce both the desired degree of grafting of the monomers onto the rubber substrate and, at the same time, polymerization of ungrafted copolymer.

Although the amount of superstrate grafted onto the rubber substrate may vary from as little as 10 parts by weight per 100 parts of substrate to as much as 250 parts per 100 parts, and even higher, the preferred rubber graft copolymers have a superstratesubstrate ratio of about 30–200:100 and most desirably about 70–150:100. With graft ratios above 30:100, a highly desirable degree of improvement in various properties generally is obtained.

Generally, the particle sizes of the rubber graft copolymers can be varied by varying the size of the rubber substrate employed. During the grafting reaction, the polymerizing monomers will graft onto this agglomerate and thus provide a rubber graft copolymer of larger size. In addition, seeding techniques during polymerization of the rubber and/or during the polymerization of the graft copolymers may be utilized to vary the size of the particles thus produced.

Chain transfer agents or molecular weight regulators also exhibit an effect upon the size of the rubber graft copolymer produced, particularly in mass and suspension polymerization reactions. The viscosity of the polymerizing mixture also tends to affect the particle size of the polymers.

To some extent, crosslinking and the ratio of the superstrate to substrate in the rubber graft copolymer tend to affect the particle size of the rubber graft copolymers by reason of an apparent tendency for the particles to aggregate or agglomerate as the amount of grafting and/or crosslinking becomes minor.

The rubber graft copolymer particles produced in various polymerization processes may be agglomerated through various techniques in the recovery thereof such as during the coagulation and/or dewatering techniques. Heat and other conditions of polymerization such as catalysts, monomer ratios, rate of addition of monomers, etc., also tend to affect the particle size of the rubber graft copolymers produced thereby.

The mismatched intermediate of the invention may be made by semi-continuous suspension, emulsion or mass polymerization, or combinations thereof, wherein during polymerization the proportion of nitrile monomer in the monomers being charged to the polymerizing mixture is purposely changed in order to control the AN content of the polymer composition being formed and provide the desired mismatch between rubber graft copolymer and ungrafted matrix copolymer. For example, a mixture of monomers having a certain proportion of AN to S can be initially charged to the polymerizing mixture to provide a corresponding composition of ungrafted matrix copolymer and graft superstrate, and later such AN proportion can be changed to make matrix and superstrate compositions having a different AN content so that the total rubber graft copolymer and ungrafted matrix has a mismatch in AN content between them. It is preferred, however, for economy of operation and to enhance formation of highly spherical particles within a relatively narrow size range, to utilize continuous mass polymerization, to be further specifically described hereafter, in the preparation of such mismatched intermediates.

Matched components may be made generally in accordance with batch or continuous suspension, emulsion or mass polymerization or combinations thereof such as mass/suspension. It is preferred, primarily to facilitate formation of small particles (e.g. less than 0.3 microns), to use batch emulsion polymerization in the preparation of such matched components.

Continuous Mass Polymerization Process

In the preferred continuous mass polymerization process for forming mismatched intermediate containing large particle size rubber graft copolymer, the rubber substrate is initially dissolved in the monomers and the solution, initiator and any other optional components such as a solvent are continuously charged to a stirred or unstirred reactor which provides a continuous polymerization zone containing the polymerizing mixture with a substantially uniform composition throughout. A plurality of reactors may be employed in series with each operating in a continuous mode in which the polymerization is advanced to the required conversion. After polymerization has progressed to the desired conversion level, the residual monomer is stripped from the polymer. The devolatilizing operation, which is the same whether one or a series of polymerization reactors is employed, is conventionally done in a separate device such as a wiped film or falling strand devolatilizer.

Typical prior art processes for the continuous production of ABS polymers by mass polymerization are described in U.S. Pat. Nos. 3,243,481, 3,337,650, 3,511,895 and 4,417,030, the content of the latter being incorporated herein by reference.

The polymerization may be initiated by any free radical generating initiator that promotes grafting and is activated at the contemplated reaction temperatures. Suitable initiators comprise the conventional monomer-soluble peroxy and perazo compounds. Exemplary initiators are t-butyl-peroxy-neodecanoate, t-butyl-peroxy-2 ethylhexanoate, 1-t-butylazo-1-cyanocyclohexane, di-tert-butyl peroxide, benzoyl peroxide, lauroyl peroxide, oleyl peroxide, toluyl peroxide, di-tert-butyl diperphthalate, tert-butyl peracetate, tert-butyl perbenzoate, dicumyl peroxide, tert-butyl peroxide isopropyl carbonate, 2,5-dimethyl-2,5 di(tert-butylperoxy)hexane, 2,5-dimethyl-2,5-di(tert-butylperoxy)-hexyne-3,tert-butyl hydroperoxide, cumene hydroperoxide, p-methane hydroperoxide, cyclopentane hydroperoxide, diisopropylbenzene hydroperoxide, p-tert-butylcumene hydroperoxide, penane hydroperoxide, 2,5-dimethylhexane-2,5-dihydroperoxide, as well as percarbonate compounds such as t-butyl-2-ethylhexyl-monoperoxycarbonate, etc. and mixtures thereof.

The initiator is generally included within the range of 0.001 to 1.0 percent by weight, and preferably on the order of 0.005 to 0.5 percent by weight of the polymerizable material, depending upon the monomers and the desired polymerization cycle.

It is often desirable to incorporate molecular weight regulators such as mercaptans, halides and terpenes in relatively small percentages by weight, on the order of 0.001 to 1.0% by weight of the polymerizable material. In addition, it may be desirable to include relatively small amounts of antioxidants or stabilizers such as the conventional alkylated phenols. Alternatively, these may be added during or after polymerization. The formulation may also contain other additives such as plasticizers, lubricants, colorants and non-reactive preformed polymeric materials which are suitable or dispersible therein.

A solvent or diluent can be used to dilute the reaction mixture to a point at which the power requirements for agitation in stirred reactor(s) are not excessive. Some or all of such diluent can be introduced with the rubber in monomer solution either as an added component or by use of a rubber which is already dissolved in a suitable solvent. Diluent can also be added separately to one or more of the reactors.

The diluents can be liquid aromatic hydrocarbons containing 6 to 10 carbon atoms, e.g., benzene, toluene, xylene, ethyl benzene, para cymene, cumene or mixtures thereof. Other organic solvents such as saturated aliphatic hydrocarbons, e.g., hexane, cyclohexane, cyclopentane and others having 5 to 7 carbon atoms, ketones, e.g., methyl ethyl ketone, methyl cyclopentane, methyl isobutyl ketone, cyclohexane or methyl propyl ketone can also be used. Methylethyl ketone is preferred.

A preferred continuous mass process for separately preparing ungrafted matrix copolymer is disclosed in U.S. Pat. No. 3,813,369 which is incorporated herein by reference. In summary, the monomers are continuously charged to a well-mixed polymerization reaction zone comprising liquid and vapor phases. The liquid phase contains the monomer composition as a solvent in which copolymer being formed from the monomer composition is dissolved. The vapor phase above the liquid phase comprises the monomer composition. Liquid and vapor are continuously removed from the reaction zone and replenished by charging at a rate about equal to the rate at which the monomers are polymerized and removed. The removed vapor phase may be condensed by reflux condensation and returned to the reaction zone as part of the monomer composition being charged to the zone. The mixture of withdrawn polymer and monomer is passed through one or more devolatilizers of the type referred to above to separate out the polymer. The hot melt may then be pelletized in conventional apparatus while the separated monomer is condensed and returned to the reaction zone. Chain transfer agents and liquid solvents, initiators, and other additives of the type described above with respect to the continuous mass graft polymerization process may be charged continuously with the monomer composition or separately to the reaction zone.

Emulsion Polymerization Process

A description of a preferred emulsion polymerization process usable in preparing a small mode rubber graft copolymer component of a polyblend within the scope of this invention is contained in U.S. Pat. No. 3,509,237, col. 7, lines 14–75 which is incorporated herein by reference.

Rubber Graft Copolymer Particle Size

For purposes of this invention, the average particle size of a rubber graft copolymer-i.e. the rubber substrate and its graft copolymer superstrate, is based upon the average of the particles of the several sizes in each rubber graft copolymer component. Particle size is measured using a photosedimentometer by the published procedure of Graves, M. J. et.al. "Size Analysis of Subsieve Powders Using A Centrifugal Photosedimentometer", British Chemical Engineering 9:742–744 (1964). Alternatively an electron microscope may be used.

As previously indicated, in preparing a large/small rubber graft copolymer polyblend of the type generally described in U.S. Pat. No. 3,509,237, one rubber graft copolymer has a weight average particle size of 0.01 to 0.3 micron with more than 75 percent of the particles within the range of 0.005 to 0.4. The preferred compositions have a weight average particle size in the range of about 0.10 to 0.20 micron.

The other rubber graft copolymer has weight average particle size in the range of 0.3 to 3 microns with more than 75 percent of the particles within the range of 0.7 to 2.1 microns in size. The preferred compositions have an average particle size in the range of about 0.9 to 1.4 microns with more than 75 percent of the particles within the range of 0.8 to 1.5 microns.

Formation of the Blend

The mismatched intermediate and matched component(s) may be blended by various techniques. Preferably the rubber graft copolymers are extrusion blended or mill rolled with or without the addition thereto of separately prepared ungrafted copolymer depending upon the amount of ungrafted copolymer formed with the two rubber graft copolymers and the total rubber graft content desired in the blend.

Generally, the blends may contain 1.0 to 70.0 percent by weight of the two rubber graft copolymers combined. Increasing the total amount of rubber graft copolymer while maintaining the ratio of large particle graft copolymer to total graft copolymer constant generally increases the Izod impact strength of the composition but rapidly increases the viscosity of the blend and decreases the tensile stress at yield and at fail and the tensile modulus. Accordingly, the preferred blends contain about 10.0 to 50.0 percent by weight of the combined rubber graft copolymers, and most desirably about 20.0 to 40.0 percent by weight.

Since it is desirable to obtain a balancing of properties and the size of the large particles generally has the most significant effect upon the properties at a constant total rubber content, the preferred compositions contain a smaller ratio of the large particle rubber graft copolymer to total rubber graft copolymer, as the particle size thereof increases.

The amount of total rubber graft copolymer in the composition required to obtain a given impact strength increases as the percentage of the large particle rubber graft copolymer in the total rubber graft copolymer is reduced. Gloss generally is adversely affected by an increase in the ratio of the large particle rubber graft copolymer to total graft copolymer. Accordingly, the ratio of large particle rubber graft copolymer, to total rubber graft copolymer in the compositions should not be more than 30:100. With respect to the proportion of rubber in the polyblend contributed by each of the large and small particle rubber graft copolymers, the weight ratio of rubber in the large particle rubber graft copolymer to that in the small particle rubber graft copolymer should be between 80:20 and 5:95 and is preferably about 10:90.

Optional components may be added to the blend composition depending upon the intended use and nature thereof, such as, for example, fillers, pigments and flame retardant additives. It may be necessary to incorporate stabilizers and antioxidants to prevent degradation of the rubber graft copolymers and oftentimes of the ungrafted copolymer of the matrix. Although stabilizers and antioxidants may be incorporated during final blending, generally it is most advantageous to incorporate these into the rubber graft copolymers after they are formed so as to minimize any tendency for degradation or oxidation during processing and storage.

If so desired, minor amounts of ungrafted rubber may be blended into the present compositions to permit some reduction in the amounts of rubber graft copolymer required but should not exceed about 10 percent by weight of the combined rubber graft copolymers to avoid undesirable reduction in properties.

The process with which the present invention is involved permits the matched and mismatched rubber graft copolymers and further ungrafted matrix copolymer to be prepared separately, the several components being storable for extended periods and blended as required to form a desired composition. Thus, the rubber level or the balance of properties can be varied by selection of readily variable percentages of the several components.

DESCRIPTION OF PREFERRED EMBODIMENTS

Exemplary of the present invention are the following specific examples wherein all parts are parts by weight unless otherwise indicated.

The following tests were conducted on specimens prepared according to such specific examples.

1. Inverted Dart Impact (J): a dart with a hemispherical head of 0.013 meters diameter was used against which the specimen was driven at a constant speed of 1.86 meters/sec.

2. Notched Izod Impact (J/m notch): ASTM D-256-70.

3. Tensile Strength at Yield (MPa): ASTM D-638-61T.

4. Apparent Viscosity (KPa-S): Capillary Extrusion Rheometer at 204° C., one reciprocal second. The viscosity was calculated using the technique described in "Automatic Capillary Rheometer, Instruction Manual for Model 3501-H" published by Monsanto Research Corp. (April 1972 edition).

5. Gloss-Percent Specular Reflectance ($R_s$) HUNTERLAB MODEL D47-6 DORI-GON from Hunter Associates Laboratory of Reston, Va.; sample molded in 2.5 seconds at 204° C.

6. Percent acrylonitrile in ungrafted copolymer matrix:elemental analysis using Elemental Analyzer Model 1102, Erba Instruments, Inc., 3 Dearborn Road, Peabody, Mass.

7. % solids in polymerizing mixture, gravimetric.

8. Particle Size-microns: Centrifugal sedimentation.

EXAMPLE 1—CONTROL

This Example illustrates preparation of a polyblend substantially in accordance with prior art Example 1 of U.S. Pat. No. 3,509,237.

PART A

Preparation of Small Particle Size Rubber Graft Copolymer

To 100 parts of a latex of butadiene/acrylonitrile copolymer (93:7) containing 48 percent solids and approximately 3 parts of rubber reserve soap as an emulsifier were added 110 parts water, 0.4 part rubber reserve soap and 0.61 part potassium persulfate.

This emulsion was heated to 80° C. with stirring and then were added thereto over a period of about three hours, 43 parts styrene, 18.5 parts acrylonirtrile and 0.54 parts of terpinolene. The emulsion was held at temperature for one hour thereafter with stirring. It was then cooled, and 15 parts of the same butadiene/AN (93:7) latex referred to above were charged to the emulsion. The graft and ungrafted mixed latex was then coagulated by the addition of magnesium sulfate and the coagulant was then washed and dried. The resultant rubber graft copolymer had a superstrate to substrate ratio of about 80:100 and a weight average particle size of about 0.18 micron. Because the ratio of monomers in the composition charged was kept uniform, the weight content of AN in the graft superstrate and ungrafted matrix should necessarily be essentially matched in that any difference should be less than 2%.

PART B

Preparation of Large Particle Size Rubber Graft Copolymer 12.6 parts of a soluble butadiene rubber obtained from Firestone Synthetic Rubber and Latex Company, Akron, Ohio as Diene 35 were dissolved in 26.0 parts of acrylonitrile and 55.6 parts styrene. The mixture was heated to 90° C. There were added thereto 0.02 part of t-butyl peracetate, 0.072 parts di-tert-butyl peroxide, 0.11 part of teripinolene as a chain transfer agent and stabilizers. The mixture was stirred and held at 90° C. over a period of approximately 4 hours, at the end of which time an additional 0.66 part of terpinolene was added.

At 23 percent conversion of the monomers, the partially polymerized syrup was dispersed in 120 parts water to which was added 5.1 parts styrene and, as a suspending agent, 0.07 part of a copolymer of acrylic acid and 2-ethylhexyl acrylate. The resulting suspension was stirred and heated to 150° C. to polymerize the remaining monomer over a period of 4 hours, then cooled, centrifuged, washed and dried to recover the rubber graft copolymer in the form of small spherical beads. The ratio of superstrate to substrate was about 70 to 100 and the particle size was about 0.9 micron. The weight percent polymerized acrylonitrile in the ungrafted matrix copolymer prior to suspension was 25.6 while the overall AN content in the ungrafted matrix after suspension polymerization was complete was 27.4 weight %. Because the composition of monomers charged was kept uniform, the composition of the AN in the graft and matrix are assumed to be essentially matched in not differing by more than 2%.

PART C

Preparation of Ungrafted Matrix Copolymer

A liquid monomer stream of 67.5/32.5 parts styrene/acrylonitrile and 0.22 parts terpinolene were continuously charged for about 0.9 hour to a mixed reaction zone held at 168° C. which was maintained about 65 volumetric percent filled with liquid with the vapor phase of unreacted monomers above in substantial equilibrium with the liquid phase. The liquid phase was continuously removed, and devolatilized to provide a copolymer of 67.5/32.5 weight percent polymerized styrene/acrylonitrile.

PART D

Preparation of Polyblend

To an extrusion blender were added 37 parts of the rubber graft copolymer of Part A, 12parts of the rubber graft copolymer of Part B and 57 parts of the ungrafted matrix copolymer of Part C. A polyblend composition was obtained containing about 16 parts of the two rubber graft coploymers with the large particle rubber graft copolymer comprising about 10% by weight of the total amount of rubber graft copolymers.

Injection molded specimens were prepared from the polyblend and tests conducted thereon provided the following results:

Izod impact: 258.3 J/m notch
Inverted dart impact: 14.8 J
Tensile strength at yield: 41.4 MPa
Apparent viscosity: 20.2 KPa-S
Gloss 2.5 sec.: 70.8

EXAMPLE 2—COMPARATIVE

This Example is not according to the invention and illustrates the performance of an ABS intermediate prepared by continuous mass polymerization which, as made, has essentially matched AN levels in the surface graft of the graft superstrate and ungrafted copolymer matrix, as a substitute in the polyblend of Example 1 for the large particle graft component of Part B.

5.3 parts of a diene rubber as Diene 35 containing 100% butadiene was dissolved in 37.8 parts of styrene monomer and 21.9 parts of acrylonitrile to form a monomer-rubber solution. The solution along with 17.5 parts ethyl benzene solvent was fed to a first reactor ($R_1$) which was sufficiently stirred to maintain an essentially uniform composition throughout. About 0.03 parts of t-butylperoxy-2-ethylhexanoate initiator was added to the monomer rubber solution during feeding to the first reactor operating at 86° C.

The feed streams were added continuously to the first reactor such that the feed streams had an average residence or pass-through time of about 2.05 hours in the reactor, maintaining a steady state monomer to polymer conversion of about 20%, providing about 20.3% polymer solids in the first reactor. The matrix SAN copolymer formed in $R_1$ had an acrylonitrile content of 28.7%. It is assumed that the AN content of the surface graft of the graft superstrate is essentially the same as that in the matrix copolymer made in $R_1$.

The partially polymerized reaction mixture from the first reactor was fed continuously to a second reactor ($R_2$) operating at 146° C. in a steady state manner with a polymer solids content of about 54.3%, and an average feed residence time of about 1.5 hours. A second feed stream of 3.3 parts styrene, 0.15 parts t-dodecyl mercaptan and 0.04 parts of 1-t-butylazo-1-cyancyclohexane and 14 parts of ethylbenzene solvent were added to the second reactor with the partially polymerized reaction mixture from the first reactor to ensure a homogenous styrene acrylonitrile matrix copolymer and rubber graft copolymer. The parts fed total 100 parts and represent the relative ratios of feed materials fed and polymerized to form the ABS polymer. The reactor mixture withdrawn from the second reactor was devolatilized continuously in a wiped film devolatilizer at 250° C. and 15 cm of Hg to provide an ABS polymer having a rubber content of about 10.9%. The ABS polymer, as made, had a monomodal distribution of rubber graft copolymer particles of about 0.6 micron weight average size, dispersed in ungrafted SAN copolymer matrix. The overall matrix copolymer made in $R_1$ and $R_2$ had an acrylonitrile content of 28.8%. It is assumed that the AN content of any surface graft of graft superstrate made in $R_2$ is essentially the same as that of the matrix copolymer found in $R_2$. A polyblend was prepared according to the procedure of, and using the same levels of components as set forth in Example 1 except that the polymer prepared in this Example 2 (i.e. the rubber graft copolymer and simultaneoulsy prepared ungrafted matrix copolymer) were substituted for the large particle size rubber graft copolymer of Example 1 and the level of separately prepared ungrafted matrix adjusted to compensate for that provided in the polymer prepared according to this Example 2.

Test results on injection molded specimens prepared as in Example 1 were as follows:

|  | Polyblend | Large Particle Graft-Matched |
|---|---|---|
| Izod impact (J/m) | 188.2 | 40.2 |
| Inverted dart impact (J) | 17.2 | 9.8 |
| Tensile Strength at yield (MPa) | 40.6 | 48.6 |
| Apparent Viscosity (KPa-S) | — | 14.4 |
| Gloss 2.5 secs. | 50.7 | 9.2 |

The above results of this Example 2 indicate that the polyblend obtained using a large particle rubber graft copolymer prepared by continuous mass polymerization having an essentially matched AN level in the surface graft of the graft superstrate and matrix copolymer gives significantly inferior impact properties and gloss in comparison with those obtained using a large particle rubber graft copolymer, prepared by batch mass-suspension polymerization (27% reduction in Izod impact and 28% reduction in 2.5 sec. gloss). The properties obtained using the large particle, rubber graft copolymer continuous-mass-produced, matched component per se, i.e. as made, were also significantly inferior to those of the blend of Example 1.

EXAMPLE 3

This Example is in accordance with the invention and illustrates the performance in a polyblend of an ABS intermediate prepared by continuous mass polymerization which has mismatched AN in the surface graft of the graft superstrate and matrix copolymers.

The polymerization procedure of Example 2 was repeated except that the proportions of constituents and operating conditions were as follows:

|  | First Reactor Feed (parts) | Second Reactor Feed (parts) |
|---|---|---|
| Rubber | 4.3 | — |
| Styrene | 38.9 | — |
| AN | 9.0 | 11.7 |
| Solvent | 13.9 | 22.1 |
| Initiator | 0.03 | 0.019 |
| Chain transfer agent | — | 0.20 |
| Temperature (°C.) | 85 | 145 |
| Residence time (hrs.) | 2.1 | 1.2 |
| % solids | 16.5 | 47.2 |
| Devolatilization Temperature (°C.) | — | 232 |

With respect to process conditions under which the mismatched intermediate of this Example 3 was formed, the two reactor system used was preferentially operated to produce (i) high grafting and low free SAN matrix formation in $R_1$ and (ii) low grafting and high free SAN matrix formation in $R_2$. More specifically, some free, ungrafted SAN matrix copolymer was formed in $R_1$ as well as SAN surface graft on the rubber substrate. It is postulated that most grafting occurring in $R_1$ is interfacial or surface grafting, i.e. grafting which occurs at the rubber-polymerized SAN matrix interface, as opposed to internal grafting within the rubber particles, because the rubber particles do not crosslink due to the relatively low $R_1$ reaction temperature and low conversion of monomers to polymer therefore any non-surface graft initially formed internally will migrate to the rubber particle surface. Also, because of the relatively low concentration of AN monomer in the feed to $R_1$ it is further postulated that the AN content in whatever free SAN copolymer is formed in $R_1$ and that in the surface graft of the superstrate formed in $R_1$ are essentially matched. In $R_2$, however, the polymerization environment is quite different. Because (i) significant unreacted AN monomer from $R_1$ (where conversion to SAN was low) plus fresh AN monomer (but no styrene) were fed to $R_2$ and (ii) the temperature in $R_2$ was significantly greater than in $R_1$, a higher conversion of AN and styrene to SAN occurred and the rubber particles crosslinked. (However, depending on the extent of mismatch desired, the composition of the AN monomer in the feed to $R_2$ can be adjusted up or down). When such crosslinking of the rubber occurs, any graft formed within the rubber particles will not migrate to the surface of the rubber particles but will rather remain within the particles principally as occlusions. The interfacial or surface grafting which occurred in $R_1$ was therefore generally not significantly altered by addition of SAN of higher AN content formed in $R_2$ and because of the purposely generated higher concentration of AN in the SAN formed in $R_2$ versus $R_1$, a mismatch resulted in that the AN content in the surface graft of the graft superstrate was lower than that in the ungrafted free SAN matrix.

The ABS polymer obtained had a rubber content of 10.2% and a weight average rubber graft copolymer particle size of 0.59 microns. The AN content of the matrix copolymer formed in $R_1$ was measured as 18.6 wt. % whereas the AN content of the overall matrix copolymer issuing from $R_2$ was 27.0 wt. %. Based on the analysis described above, the AN content of the surface graft of the graft superstrate is considered mismatched with that in the ungrafted matrix copolymer.

Test results on injection molded specimens prepared as in Example 1 were as follows:

|  | Polyblend | Large Particle Rubber Graft Copolymer (Mismatched AN) |
|---|---|---|
| Izod Impact (J/m) | 229 | 65.4 |
| Inverted Dart Impact (J) | 20.4 | 11.2 |
| Tensile Strength at Yield (MPA) | 41.1 | 44.1 |
| Apparent Viscosity (KPa-S) | — | 6.5 |
| Gloss 2.5 secs. | 60 | 9.3 |

The above results dramatically illustrate that a polyblend using a large particle rubber graft copolymer prepared by continuous mass polymerization having mismatched AN levels in the surface graft of the graft superstrate and ungrafted matrix copolymer has impact and gloss properties significantly better than those obtained when the AN in the graft and matrix is matched (Example 2) and even though the properties of the mismatched intermediate per se are not significantly different from those of the matched composition of Example 2. Furthermore, such polyblend properties of impact and gloss obtained in this Example 3 approach those obtained in control Example 1. The reason for this unexpected result is unknown.

It is predicted that a mismatched large particle graft copolymer prepared by other polymerization techniques such as emulsion, suspension or mass/suspension wherein during polymerization the ratio of AN monomer in the charge to the reactors is purposely changed in order to controllably change the AN content of the polymer being formed should give equivalent results.

EXAMPLE 4

This Example is also in accordance with the invention. The polymerization procedure of Example 3 was essentially repeated except that a different initiator and methylethyl ketone was used as diluent instead of ethyl benzene and the proportions of constituents and operating conditions were as follows:

|  | First Reactor Feed (parts) | Second Reactor Feed (parts) |
|---|---|---|
| Rubber | 8.2 | — |
| Styrene | 46.9 | — |
| AN | 9.1 | 17.1 |
| Diluent | 14.1 | 3.9 |
| Initiator (t-butyl peroxy neodecanoate) | 0.035 | — |
| Chain Transfer Agent (iso-octyl-thioglycolate) | — | 0.18 |
| Temperature (°C.) | 86 | 161 |
| Residence Time (hrs.) | 2.08 | 1.3 |
| % Solids | 27.4 | 60 |
| % Conversion | 24 | 70 |
| Devolatilization Temp. (°C.) |  | 240 |

The ABS polymer issuing from the devolatilzer had a rubber content of about 16.7%. The ABS polymer, as made, had a monomodal distribution of rubber graft copolymer particles of about 0.5 microns. The matrix copolymer issuing from the devolatilizer had an AN content of 29.7 wt. % whereas the matrix copolymer in $R_1$ had an AN content of 18.5 weight %. The surface graft of SAN of the graft superstrate which was essentially formed entirely in the first reactor was therefore assumed to be 18.5 wt. % AN so that the AN content of the as made total matrix and surface graft was mismatched by about 11.2% (29.7% versus 18.5%).

A polyblend was prepared according to the procedure of Example 3 except that the polymer prepared in this Example 4 was substituted for that of Example 3. The small particle size rubber graft copolymer had a particle size of 0.2 microns and was present as 90 wt. % in the polyblend which had a total rubber content of 16 wt. %. Test results on injection molded specimens prepared as in Example 3 were as follows:

|  | Polyblend | Large Particle Graft (mismatched intermediate) |
|---|---|---|
| Izod impact (J/m) | 220 | 152.1 |
| Inverted dart impact (J) | 18.1 | 20 |
| Tensile Strength at yield (MPa) | 43 | 40 |
| Apparent Viscosity (KPa-S) | — | 24.1 |
| Gloss (2.5 seconds) | 83.9 | 38.6 |

The above results of this Example 4 further illustrate that a polyblend using a large particle rubber graft copolymer prepared by continuous mass polymerization having mismatched AN content in the surface graft of the superstrate and ungrafted matrix copolymer has izod impact and 2.5 second gloss properties significantly better than those obtained for the mismatched intermediate per se. Furthermore, the gloss and inverted dart impact properties obtained in this Example 4 exceed those obtained in control Example 1.

The preceding description is set forth for purposes of illustration only and is not to be taken in a limited sense. Various modifications and alterations will be readily suggested to persons skilled in the art. It is intended, therefore, that the foregoing be considered as exemplary only and that the scope of the invention be ascertained from the following claims.

I claim:

1. A composition comprising a blend of separately prepared polymeric compositions (A) and (B),
   (A) being a first rubber graft copolymer formed by graft polymerizing (a) monoalkenyl aromatic monomer and ethylenically unsaturated nitrile monomer on (b) a preformed graftable rubber containing a rubber-forming monomer component to surface graft at least a portion of the polymerizing monomers onto said rubber and provide a first graft copolymer while simultaneously forming a first ungrafted copolymer of said monomers in which said first graft copolymer is dispersed, the level of surface-grafted unsaturated nitrile monomer in the first graft copolymer being different by at least 2.0 weight percent from that in said first ungrafted copolymer; and
   (B) being a second rubber graft copolymer of said monomers on a preformed graftable rubber substrate dispersed in a simultaneously formed second ungrafted copolymer of said monomers, the level of surface-grafted ethylenically unsaturated nitrile monomer in said second rubber graft copolymer being essentially matched with that in said second ungrafted copolymer.

2. The composition of claim 1 including additional ungrafted copolymer of said monomers prepared separately from said first and second rubber graft copolymers.

3. The composition of claim 1 wherein the first graft copolymer has an average particle size of about 0.3 to 3 microns and the second graft copolymer has an average particle size of about 0.01 to 0.3 microns.

4. The composition of claim 1 wherein the monoalkenyl aromatic monomer is styrene and the ethylenically unsaturated nitrile monomer is acrylonitrile.

5. The composition of claim 2 wherein the weight ratio of rubber in (A) to rubber in (B) is between 80:20 and 5:95.

6. The composition of claim 1,2,3,4, or 5 wherein the level of polymerized unsaturated nitrile monomer in the surface graft of the first graft copolymer is less than the level of polymerized unsaturated nitrile in the first ungrafted copolymer by about 5 weight percent.

7. The composition of claim 6 wherein the first graft copolymer has about 18 to about 25 weight percent surface-grafted acrylonitrile and the first ungrafted copolymer has about 25.5 to about 33 weight percent polymerized acrylonitrile.

8. The composition of claim 7 wherein the weight ratio of rubber in (A) to rubber in (B) is about 10:90.

9. In a polyblend comprising first and second graft copolymers of acrylonitrile and styrene on diene rubber, each graft copolymer having a different average particle size range, dispersed in a matrix copolymer of styrene and acrylonitrile wherein the weight of acrylonitrile in the graft phases is less than the weight of acrylonitrile in the matrix copolymer, the improvement wherein:
   one of the graft copolymers and part of the matrix copolymer is an initially, separately prepared mismatched composition comprising styrene and acrylonitrile surface grafted on a diene rubber substrate dispersed in a surrounding matrix copolymer of styrene and acrylonitrile in which the weight of surface-grafted acrylonitrile is lower by at least 2.0% than the weight of polymerized acrylonitrile in the surrounding matrix copolymer.

10. The polyblend of claim 9 wherein the weight ratio of rubber in the graft copolymer having the larger particle size range to that in the copolymer having the smaller particle size range is about 10 90.

11. The composition of claim 4 wherein said (A) is formed by graft polymerizing a monomer mixture consisting essentially of 60 to 85 weight % styrene and 15 to 40 weight % acrylonitrile onto said performed graftable rubber.

12. A process for preparing a polyblend which comprises the steps of:
   (i) continuously mass polymerizing a mixture of monomers comprising monoalkenyl aromatic monomer and ethylenically unsaturated nitrile monomer in the presence of a preformed graftable rubber containing a rubber-forming monomer component to surface graft at least a portion of the polymerizing monomers onto said rubber and provide a first graft copolymer while simultaneously forming a first ungrafted copolymer of said monomers in which said first graft copolymer is dispersed, the level of surface-grafted ethylenically unsaturated nitrile monomer in the first graft copolymer being different by at least 2 weight % from that in said first ungrafted copolymer; and
   (ii) blending the product of step (i) with a composition comprising a second ungrafted copolymer of said monomers and a second graft copolymer of said monomers on a graftable rubber, the level of surface-grafted ethylenically unsaturated nitrile monomer in said second graft copolymer being essentially matched with and differing by less than 2 weight % from that in said second ungrafted copolymer.

13. The process of claim 12 wherein the level of polymerized unsaturated nitrile monomer in the surface graft of the first graft copolymer is less than that in said first ungrafted copolymer.

14. The process of claim 12 wherein the monoalkenyl aromatic monomer is styrene.

15. The process of claim 12 wherein the ethylenically unsaturated nitrile monomer is acrylonitrile.

16. The process of claim 12 wherein the monoalkenyl aromatic monomer is styrene and the unsaturated nitrile monomer is acrylonitrile.

17. The process of claim 12, 13, 14, 15 or 16 wherein the level of unsaturated nitrile monomer in (i) the surface graft of the first graft copolymer is about 18 to about 25% by weight and in (ii) the first ungrafted copolymer is about 25.5 to about 33% weight, based respectively on the weight of the first graft copolymer and the first ungrafted copolymer.

18. The process of claim 17 wherein the weight ratio in the polyblend of rubber obtained from step (i) to that obtained from step (ii) is between 80:20 and 5:95.

19. The process of claim 18 wherein said weight ratio is about 10:90.

* * * * *